US012335704B2

(12) United States Patent
Jin et al.

(10) Patent No.: US 12,335,704 B2
(45) Date of Patent: Jun. 17, 2025

(54) MULTIFUNCTIONAL SOUNDING DEVICE

(71) Applicant: AAC Microtech (Changzhou) Co., Ltd., Jiangsu (CN)

(72) Inventors: Xin Jin, Changzhou (CN); Fan Zhang, Changzhou (CN); Wei Song, Changzhou (CN); Ronglin Linghu, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 246 days.

(21) Appl. No.: 18/341,751

(22) Filed: Jun. 26, 2023

(65) Prior Publication Data

US 2024/0147158 A1 May 2, 2024

Related U.S. Application Data

(63) Continuation of application No. PCT/CN2022/134611, filed on Nov. 28, 2022.

(30) Foreign Application Priority Data

Oct. 28, 2022 (CN) ........................ 202222868892.X

(51) Int. Cl.
*H04R 7/06* (2006.01)
*H04R 9/06* (2006.01)

(52) U.S. Cl.
CPC ................. *H04R 7/06* (2013.01); *H04R 9/06* (2013.01); *H04R 2499/11* (2013.01)

(58) Field of Classification Search
CPC ........ H04R 7/06; H04R 9/06; H04R 2499/11; H04R 11/02; H04R 2400/03; H04R 2400/11; H04R 9/02; H04R 9/025
See application file for complete search history.

(56) References Cited

FOREIGN PATENT DOCUMENTS

CN 109889959 A * 6/2019

* cited by examiner

*Primary Examiner* — Tuan D Nguyen
(74) *Attorney, Agent, or Firm* — Wiersch Law Group

(57) ABSTRACT

The present disclosure provides a multifunctional sounding device, which includes a lower housing, an upper housing and a sounding unit. The sounding unit includes a frame, a vibration system and a magnetic circuit system. The magnetic circuit system includes a main magnetic circuit, a first auxiliary magnetic circuit and a second auxiliary magnetic circuit. The first auxiliary magnetic circuit includes a first auxiliary magnet and a first auxiliary pole plate. The first auxiliary pole plate fixes the first auxiliary magnet to the upper housing. The multifunctional sounding device also includes a motor assembly, and the motor assembly includes a vibration unit and an elastic member. The multifunctional sounding device of the present disclosure not only simplifies the fixing method of the magnetic circuit system, but also reduces the dimensional accuracy requirements of the magnetic circuit system, meeting the needs of mass production.

10 Claims, 2 Drawing Sheets

MULTIFUNCTIONAL SOUNDING DEVICE

TECHNICAL FIELD

The present disclosure relates to the field of electroacoustic transducers, especially to a multifunctional sounding device.

BACKGROUND ART

With the continuous innovation of smart mobile devices, they are more and more popular among users. The most common ones are mobile to phones, tablets, and handheld game consoles. Music playback and vibration functions have become the basis for smart mobile devices. Function. The multifunctional sounding device with music playing function and vibration function has been widely applied to smart mobile devices.

The multifunctional sounding device of the related art includes a housing body, a sounding unit accommodated in the housing body, and a motor assembly for generating vibration. Wherein, the sounding unit includes a basin frame, a vibration system, and a magnetic circuit system with a magnetic gap. The motor assembly mainly includes a vibration unit, and an elastic member that elastically suspends the vibration unit on the housing body, wherein, the vibration unit mainly drives the coil.

In order to provide sufficient driving force for the driving coil and maintain the magnetic gap of the magnetic circuit system, the entire magnetic circuit system needs to be fixed in the product. Meanwhile, the fixing method of the magnetic circuit system in the multifunctional sounding device in the prior art is not only too complicated, but also requires too high precision of dimensions, which cannot meet the requirements of mass production.

Therefore, it is necessary to provide a new the multifunctional sounding device to solve the above technical problems.

SUMMARY OF THE INVENTION

On of the purposes of the present disclosure is to provide a multifunctional sounding device to solve the problem that the fixing method of the magnetic circuit system in the multifunctional sounding device in the prior art is not only too complicated, but also requires too high precision of its size.

In order to achieve the above-mentioned object, the present disclosure provides a multifunctional sounding device, including: a lower housing; an upper housing engaging with the lower housing for forming a containment space; a sound outlet penetrating the upper housing; a sounding unit accommodated in the containment space, including a frame, a vibration system fixed to the frame, and a magnetic circuit system having a magnetic gap for driving the vibration system to vibrate; and a motor assembly accommodated in the containment space. The motor assembly includes a vibration unit arranged on a side of the magnetic circuit system away from the vibration system, and an elastic member elastically suspending the vibration unit in the containment space.

The magnetic circuit system includes a main magnetic circuit fixed to the lower housing, a first auxiliary magnetic circuit and a second auxiliary magnetic circuit respectively surrounding the main magnetic circuit for forming the magnetic gap. The vibration unit including a driving coil fixedly connected to the second auxiliary magnetic circuit.

The first auxiliary magnetic circuit includes a first auxiliary magnet, a first auxiliary pole plate fixed to the first auxiliary magnet for fixing the first auxiliary magnet to the upper housing.

In addition, the first auxiliary pole plate includes a stacked part fixed on the first auxiliary magnet, and an extension part formed by extending a side of the stacked part away from the main magnet towards a peripheral side of the upper housing; the extension part extends to a connection to between the upper housing and the lower housing.

In addition, the extension part includes a folded part formed by bending and extending the side of the stacked part away from the main magnet toward the lower housing, and a flat board part formed by bending and extending one end of the folded part away from the stacked part toward the peripheral side of the upper housing; the folded part and the first auxiliary magnet are spaced apart, and the flat board part and the stacked part are parallel to each other; the connection position between the upper housing and the lower housing is provided with a containment hole running through the upper housing and/or the lower housing, the end of the flat board part away from the folded part extends into the containment hole and is fixed to the upper housing.

In addition, the magnetic circuit system is rectangular; the main magnetic circuit includes a lower plate fixed to the lower housing, a main magnet fixed on the side of the lower plate close to the vibration system, and a main pole plate stacked and fixed on the side of the main magnet close to the vibration system; the first auxiliary magnet includes two and are respectively positioned on opposite sides of the short axis of the main magnet; the first auxiliary pole plate also includes two, and one of the first auxiliary pole plates is stacked and fixed on one of the first auxiliary magnets; the second auxiliary magnetic circuit includes two of second auxiliary magnets respectively positioned on opposite sides of the long axis of the main magnet, and two of second auxiliary pole plates respectively stacked on the side of the two second auxiliary magnets close to the vibration system.

In addition, an amount of the driving coil is two, and the two driving coils are respectively arranged on opposite sides of the lower plate along a vibration direction of the vibration unit.

In addition, the vibration unit further includes a weight; the elastic members are respectively fixed on opposite sides of the weight along a vibration direction of the vibration unit; the weight is arranged with an installation hole penetrating therethrough; the lower plate passes through the installation hole and is fixed on the side of the lower housing opposite to the sound outlet; both the second auxiliary magnet and the driving coil are fixedly connected to the weight.

In addition, an amount of the elastic member is two; the two elastic members are arranged symmetrically to a center and are respectively positioned on opposite sides of the weight along the vibration direction of the vibration unit; one end of the elastic member is fixed to a peripheral side of the lower housing or the upper housing, and the other end is fixed to the peripheral side of the weight; each of the elastic member is in a U-shape.

In addition, the motor assembly further includes a flexible conductive connector electrically connected to the driving coil; the flexible conductive connector includes a fixed part fixed on the side of the weight away from the vibration system, an elastic arm formed by bending and extending one side of the fixed part, a penetrated part extending from the elastic arm to the containment space and passing through the lower housing and/or the upper housing.

In addition, the lower housing is provided with a protrusion part protruding toward the direction close to the magnetic circuit system; the lower splint is fixed to the protrusion part.

In addition, the vibration system includes a diaphragm fixed to the frame and a voice coil inserted into and suspended in the magnetic gap and driving the diaphragm to vibrate; a side of the diaphragm away from the frame is fixed to the upper housing and opposite to the sound outlet.

Compared with related technologies, in the multifunctional sounding device of the utility model, the main magnetic circuit is fixed to the lower housing. The first auxiliary magnet of the first auxiliary magnetic circuit is fixed to the upper housing by the first auxiliary pole plate stacked and fixed thereon. The second auxiliary magnetic circuit is fixedly connected with the driving coil. In this way, the main magnetic circuit, the first auxiliary magnetic circuit and the second auxiliary magnetic circuit are respectively fixed to the lower housing or the upper housing. This not only simplifies the fixing method of the magnetic circuit system, but also reduces the dimensional accuracy requirements of the magnetic circuit system, which meets the needs of mass production.

DETAILED DESCRIPTION OF EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
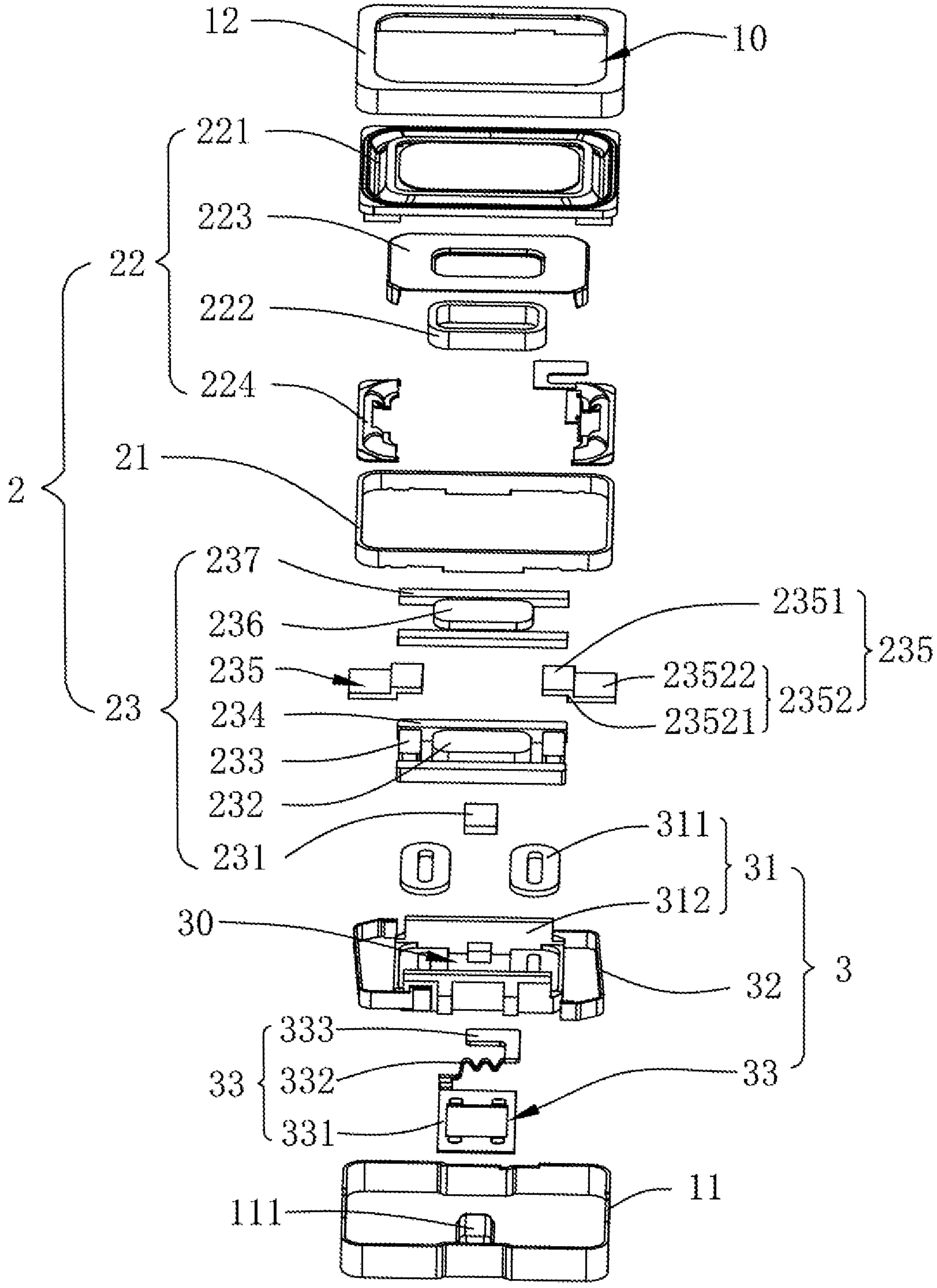
FIG. 1 is an exploded view of a multifunctional sounding device in accordance with an embodiment of the present disclosure.
Figure 2:
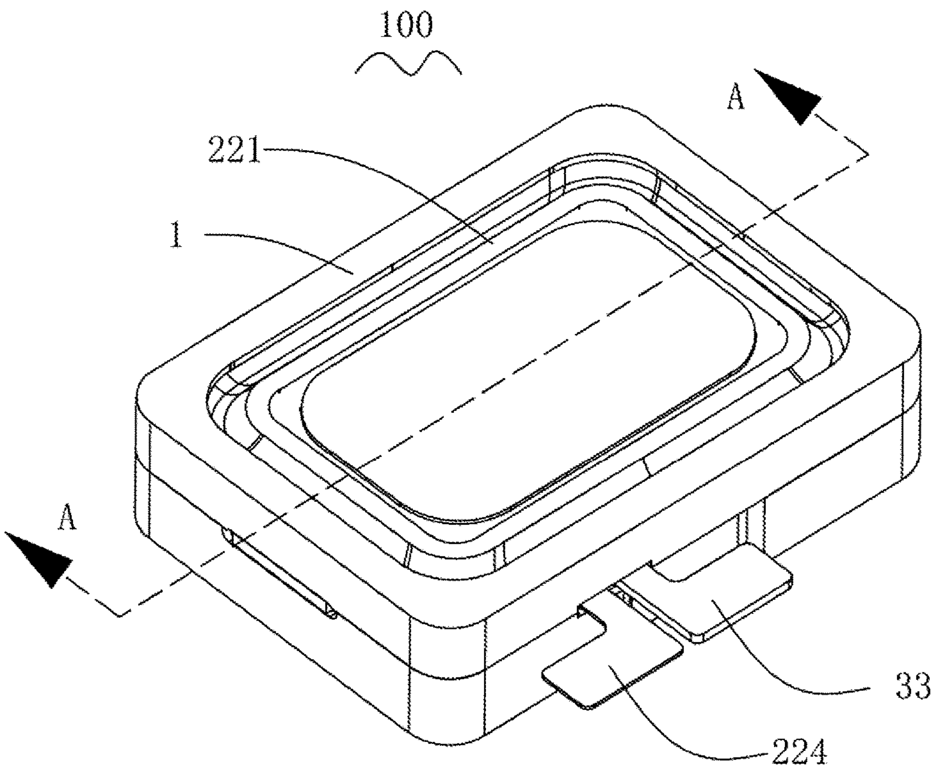
FIG. 2 is an isometric view of the multifunctional sounding device of the present disclosure.
Figure 3:
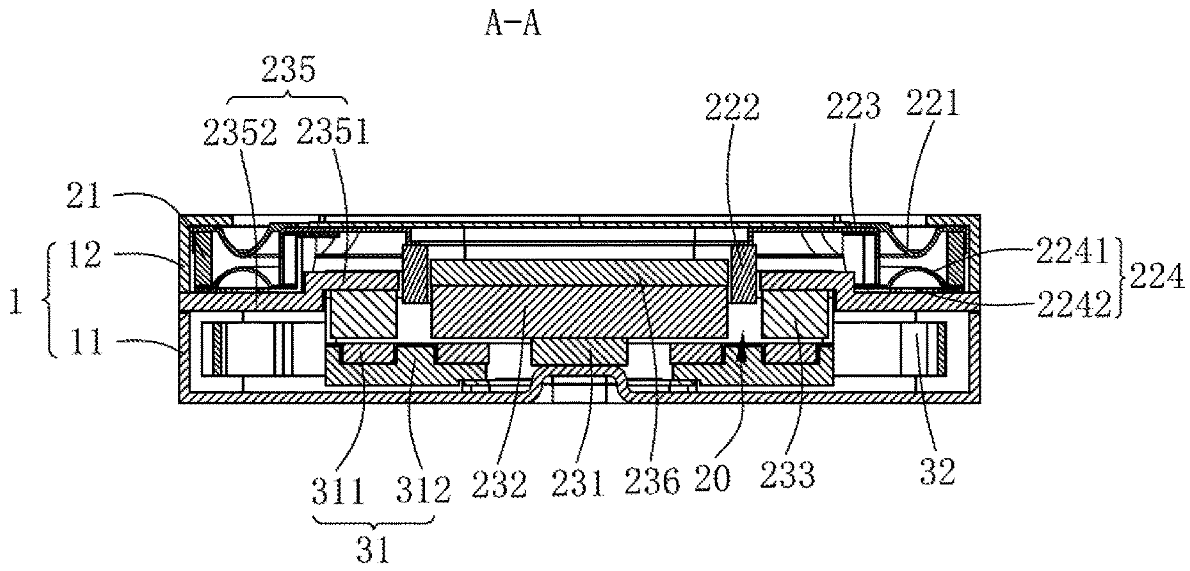
FIG. 3 is a cross-sectional view of the multifunctional sounding device taken along line AA in FIG. 2.

As shown in FIGS. 1-3, an embodiment of the present disclosure provides a multifunctional sounding device 100, which includes a lower housing 11, an upper housing that is built on the lower housing 11 and jointly forms the containment space 12, a sounding unit 2 accommodated in the containment space, and a motor assembly 3. The upper housing 12 is provided with a sound outlet 10 penetrating therethrough.

Specifically, the sounding unit 2 includes a frame 21, a vibration system 22 fixed to the frame 21, and a magnetic circuit system 23 having the magnetic gap 20 and driving the vibration system 22 to vibrate and produce sound.

The vibration system 22 includes a diaphragm 221 fixed on the frame 21 and a voice coil 222 inserted into and suspended in the magnetic gap 20 to drive the diaphragm 221 to vibrate. The side of the diaphragm 221 away from the frame 21 is fixed to the upper housing 12 and is arranged opposite to the sound outlet 10.

Specifically, the magnetic circuit system 23 includes a main magnetic circuit, a first auxiliary magnetic circuit and a second auxiliary magnetic circuit respectively surrounding the main magnetic circuit and forming a magnetic gap 20 with space from the main magnetic circuit.

Wherein, the magnetic circuit system 23 is rectangular; the main magnetic circuit is fixed on the lower housing 11. The main magnetic circuit includes a lower splint 231 fixed on the lower housing 11, a main magnet 232 fixed on the side of the lower splint 231 close to the vibration system 22, and a main pole plate 236 fixed on the side of the main magnet 232 close to the vibration system 22. This increases the magnetic field of the magnetic circuit system 23.

The first auxiliary magnetic circuit includes a first auxiliary magnet 233, a first auxiliary pole plate 235 stacked and fixed to the first auxiliary magnet 233. The first auxiliary pole plate 235 fixes the first auxiliary magnet 233 to the upper housing 12. In this embodiment, the first auxiliary magnet 233 includes two and are respectively positioned on opposite sides of the short axis of the main magnet 232. The first auxiliary pole plate 235 also includes two, and one of the first auxiliary pole plate 235 is stacked and fixed on one of the first auxiliary magnet 233. In this way, the magnetic field of the magnetic circuit system 23 can be increased through the first auxiliary pole plate 235, and the first auxiliary magnet 233 can be fixed to the upper housing 12 through the first auxiliary pole plate 235.

The second auxiliary magnetic circuit includes two of second auxiliary magnets 234 positioned on opposite sides of the long axis of the main magnet 232, and two of second auxiliary pole plates 237 respectively stacked on the sides of the two second auxiliary magnets 234 close to the vibration system 22. This increases the magnetic field of the magnetic circuit system 23.

Specifically, the motor assembly 3 includes a vibration unit 31 arranged on the side of the magnetic circuit system 23 away from the diaphragm 221 and an elastic member 32 elastically suspending the vibration unit 31 in the containment space. The vibration unit 31 includes a driving coil 311 fixedly connected to the second auxiliary magnet 234.

Wherein, the vibration principle of the motor assembly 3 is: The driving coil 311 is positioned within the magnetic field of the main magnet 232 and the first auxiliary magnet 233 fixed to the housing body 1, and interacts to generate an electromagnetic field. At this moment, controlling the current direction of the driving coil 311 can realize mutual driving force with the main magnet 232 and the first auxiliary magnet 233. The main magnet 232 and the first auxiliary magnet 233 are fixed on the housing body 1 and cannot move, they serve as the stator; the driving coil 311 is suspended in the containment space 32 through the elastic member and can move, serves as the mover. In this way, the main magnet 232 and the first auxiliary magnet 233 can make the driving coil 311 vibrate, thereby driving the whole vibration unit 31 to vibrate.

The second auxiliary magnetic circuit is part of the mover in the motor assembly 3, namely the second auxiliary magnet 234 and the second auxiliary pole plate 237 are part of the mover of the motor.

In this embodiment, the lower housing 11 is provided with a protrusion part 111 protruding toward the direction close to the magnetic circuit system 23, and the lower splint 231 is fixed to the protrusion part 111.

In this embodiment, the vibration system 22 further includes a skeleton 223 fixed to the diaphragm 221 and an elastic support assembly 224 spaced apart from the diaphragm 221. The voice coil 222 is suspended in the magnetic gap 20 through the skeleton 223. The elastic support assembly 224 includes two and are respectively fixed on opposite sides of the frame 21. Two of the elastic support assemblies

224 are respectively fixed on opposite sides of the skeleton 223. On the one hand, the elastic support assembly 224 is used to strengthen the vibration effect of the diaphragm 221 and improve the acoustic performance of the multifunctional sounding device 100, on the other hand, it is used to balance the swing of the vibration system 22 and improve the stability of the multifunctional sounding device 100.

In this embodiment, the elastic support assembly 224 includes an auxiliary diaphragm 2241 fixedly connected to the skeleton 223 and a circuit board 2242 fixed to the auxiliary diaphragm 2241; the circuit board 2242 is FPC (the flexible circuit board). One of the circuit boards 2242 passes through the lower housing 11 and/or the upper housing 12 and is exposed to outside, and is used to introduce electrical signals to the voice coil 222, that is, the voice coil 222 can be electrically connected to the external circuit through the circuit board 2242, so as to realize the independent control of the sounding unit 2.

In this embodiment, the first auxiliary pole plate 235 fixes the first auxiliary magnet 233 to the peripheral side of the upper housing 12 corresponding to the first auxiliary pole plate 235.

In this embodiment, the first auxiliary pole plate 235 includes a stacked part 2351 stacked and fixed to the first auxiliary magnet 233, and an extension part 2352 formed by extending the side of the stacked part 2351 away from the main magnet 232 towards the peripheral side of the upper housing 12. The extension part 2352 extends to the connection position between the upper housing 12 and the lower housing 11 and is fixedly connected with the upper housing 12.

In this embodiment, the extension part 2352 includes a folded part 23521 formed by bending and extending the side of the stacked part 2351 away from the main magnet 232 towards the lower housing 11, and a flat board part 23522 formed by bending and extending the end of the folded part 23521 away from the stacked part 2351 towards the peripheral side of the upper housing 12. The folded part 23521 and the first auxiliary magnet 233 are spaced apart, and the flat board part 23522 and the stacked part 2351 are parallel to each other.

The connection position of the upper housing 12 and the lower housing 11 is provided with a containment hole penetrating through the upper housing 12 and/or the lower housing 11. The end of the flat board part 23522 away from the folded part 23521 extends into the containment hole and is fixed with the upper housing 12.

In this embodiment, the driving coil 311 includes two and are respectively arranged on opposite sides of the lower splint 231 along the vibration direction of the vibration unit 31.

In this embodiment, the vibration unit 31 further includes a weight 312, and the elastic members 32 are respectively fixed on opposite sides of the weight 312 along the vibration direction of the vibration unit 31. The weight 312 is provided with an installation hole 30 penetrating therethrough; the lower splint 231 passes through the installation hole 30 and is fixed on the side of the lower housing 11 opposite to the sound outlet 10. The second auxiliary magnet 234 and the driving coil 311 are fixedly connected to the weight 312. In this way, the weight 312 can be used to counterweight the vibration unit 31 to provide the vibration amplitude of the vibration unit 31, thereby improving the vibration effect of the device.

In addition, based on the arrangement of the main magnet 232, the first auxiliary magnet 233 and the second auxiliary magnet 234 in the magnetic circuit system 23, the weight can be designed to be smaller under the same vibration effect, so that more space can be used as the back cavity of the sounding unit 2 during vibration sounding, thereby improving the low-frequency acoustic performance.

In this embodiment, the motor assembly 3 further includes a flexible conductive connector 33 electrically connected to the driving coil 311. The flexible conductive connector 33 includes a fixed part 331 fixed on the side of the weight 312 away from the diaphragm 221, an elastic arm 332 formed by bending and extending one side of the fixed part 331, and a penetrated part 333 extending from the elastic arm 332 to the outside of the containment space and passing through the lower housing 11 and/or the upper housing 12. The flexible conductive connector 33 is FPC (the flexible circuit board), which introduces electrical signals to the driving coil 311, so as to realize the independent control of the motor assembly 3.

In this embodiment, the elastic member 32 includes two and both are U-shaped structures. The two elastic members 32 are arranged symmetrically to the center and are respectively positioned on opposite sides of the weight 312 along the vibration direction of the vibration unit 31. One end of the elastic member 32 is fixed to the peripheral side of the lower housing 11 or the upper housing 12. The other end of the elastic member 32 is fixed to the peripheral side of the weight 312. The weight 312 can be elastically suspended in the containment space more stably.

Compared with the related art, in the multifunctional sounding device 100 of this embodiment, the main magnetic circuit is fixed to the lower housing 11. The first auxiliary magnet 233 of the first auxiliary magnetic circuit is fixed to the upper housing 12 through the first auxiliary pole plate 235 stacked and fixed thereon. The second auxiliary magnetic circuit is fixedly connected with the driving coil 311. In this way, the main magnetic circuit, the first auxiliary magnetic circuit and the second auxiliary magnetic circuit are fixed to the lower housing 11 or the upper housing 12 respectively. It not only simplifies the fixing method of the magnetic circuit system 23, but also reduces the dimensional accuracy requirements of the magnetic circuit system 23, which meets the requirements of mass production. In addition, the second auxiliary magnetic circuit is used as the mover of the motor, that is, as a part of the vibration unit 31, so that the counterweight of the weight 312 can be reduced, and part of the volume of the weight 312 can be released. In the housing body 1 with the same external volume, the volume released by the weight 312 can be converted into the volume of the back cavity of the loudspeaker (the sounding part). It is beneficial to improve the performance of the loudspeaker, and the counterweight of the weight 312 is reduced, which is beneficial to save the material cost of the weight 312.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device, including:

a lower housing;

an upper housing engaging with the lower housing for forming a containment space;

a sound outlet penetrating the upper housing;

a sounding unit accommodated in the containment space, including a frame, a vibration system fixed to the frame, and a magnetic circuit system having a magnetic gap for driving the vibration system to vibrate;

a motor assembly accommodated in the containment space, including a vibration unit arranged on a side of the magnetic circuit system away from the vibration system, and an elastic member elastically suspending the vibration unit in the containment space; wherein the magnetic circuit system includes a main magnetic circuit fixed to the lower housing, a first auxiliary magnetic circuit and a second auxiliary magnetic circuit respectively surrounding the main magnetic circuit for forming the magnetic gap;

the vibration unit including a driving coil fixedly connected to the second auxiliary magnetic circuit; and the first auxiliary magnetic circuit includes a first auxiliary magnet, a first auxiliary pole plate fixed to the first auxiliary magnet for fixing the first auxiliary magnet to the upper housing.

2. The multifunctional sounding device as described in claim 1, wherein, the first auxiliary pole plate includes a stacked part fixed on the first auxiliary magnet, and an extension part formed by extending a side of the stacked part away from the main magnet towards a peripheral side of the upper housing; the extension part extends to a connection between the upper housing and the lower housing.

3. The multifunctional sounding device as described in claim 2, wherein, the extension part includes a folded part formed by bending and extending the side of the stacked part away from the main magnet toward the lower housing, and a flat board part formed by bending and extending one end of the folded part away from the stacked part toward the peripheral side of the upper housing; the folded part and the first auxiliary magnet are spaced apart, and the flat board part and the stacked part are parallel to each other; the connection position between the upper housing and the lower housing is provided with a containment hole running through the upper housing and/or the lower housing, the end of the flat board part away from the folded part extends into the containment hole and is fixed to the upper housing.

4. The multifunctional sounding device as described in claim 1, wherein, the magnetic circuit system is rectangular; the main magnetic circuit includes a lower plate fixed to the lower housing, a main magnet fixed on the side of the lower plate close to the vibration system, and a main pole plate stacked and fixed on the side of the main magnet close to the vibration system; the first auxiliary magnet includes two and are respectively positioned on opposite sides of the short axis of the main magnet; the first auxiliary pole plate also includes two, and one of the first auxiliary pole plates is stacked and fixed on one of the first auxiliary magnets; the second auxiliary magnetic circuit includes two of second auxiliary magnets respectively positioned on opposite sides of the long axis of the main magnet, and two of second auxiliary pole plates respectively stacked on the side of the two second auxiliary magnets close to the vibration system.

5. The multifunctional sounding device as described in claim 1, wherein, an amount of the driving coil is two, and the two driving coils are respectively arranged on opposite sides of the lower plate along a vibration direction of the vibration unit.

6. The multifunctional sounding device as described in claim 1, wherein, the vibration unit further includes a weight; the elastic members are respectively fixed on opposite sides of the weight along a vibration direction of the vibration unit; the weight is arranged with an installation hole penetrating therethrough; the lower plate passes through the installation hole and is fixed on the side of the lower housing opposite to the sound outlet; both the second auxiliary magnet and the driving coil are fixedly connected to the weight.

7. The multifunctional sounding device as described in claim 6, wherein, an amount of the elastic member is two; the two elastic members are arranged symmetrically to a center and are respectively positioned on opposite sides of the weight along the vibration direction of the vibration unit; one end of the elastic member is fixed to a peripheral side of the lower housing or the upper housing, and the other end is fixed to the peripheral side of the weight; each of the elastic member is in a U-shape.

8. The multifunctional sounding device as described in claim 6, wherein, the motor assembly further includes a flexible conductive connector electrically connected to the driving coil; the flexible conductive connector includes a fixed part fixed on the side of the weight away from the vibration system, an elastic arm formed by bending and extending one side of the fixed part, a penetrated part extending from the elastic arm to the containment space and passing through the lower housing and/or the upper housing.

9. The multifunctional sounding device as described in claim 1, wherein, the lower housing is provided with a protrusion part protruding toward the direction close to the magnetic circuit system; the lower splint is fixed to the protrusion part.

10. The multifunctional sounding device as described in claim 1, wherein, the vibration system includes a diaphragm fixed to the frame and a voice coil inserted into and suspended in the magnetic gap and driving the diaphragm to vibrate; a side of the diaphragm away from the frame is fixed to the upper housing and opposite to the sound outlet.

* * * * *